United States Patent
Mangold et al.

(10) Patent No.: US 10,601,007 B2
(45) Date of Patent: Mar. 24, 2020

(54) COOLING PLATE FOR A BATTERY CELL IN THE FORM OF A MOUNTING PLATE

(71) Applicant: Robert Bosch GmbH, Stuttgart (DE)

(72) Inventors: Benjamin Mangold, Stuttgart (DE); Frank Stimm, Leonberg (DE)

(73) Assignee: Robert Bosch GmbH, Stuttgart (DE)

( * ) Notice: Subject to any disclaimer, the term of this patent is extended or adjusted under 35 U.S.C. 154(b) by 233 days.

(21) Appl. No.: 15/536,182

(22) PCT Filed: Nov. 24, 2015

(86) PCT No.: PCT/EP2015/077440
§ 371 (c)(1),
(2) Date: Jun. 15, 2017

(87) PCT Pub. No.: WO2016/096329
PCT Pub. Date: Jun. 23, 2016

(65) Prior Publication Data
US 2017/0346055 A1 Nov. 30, 2017

(30) Foreign Application Priority Data
Dec. 16, 2014 (DE) .................. 10 2014 225 971

(51) Int. Cl.
*H01M 2/10* (2006.01)
*H01M 10/625* (2014.01)
(Continued)

(52) U.S. Cl.
CPC ............ *H01M 2/1083* (2013.01); *B60K 1/04* (2013.01); *B60L 50/64* (2019.02); *B60L 58/26* (2019.02);
(Continued)

(58) Field of Classification Search
CPC ......... H01M 10/6556; H01M 10/6557; H01M 2/1083; H01M 10/613; H01M 10/625;
(Continued)

(56) References Cited

U.S. PATENT DOCUMENTS

2008/0117595 A1 5/2008 Kramer
2012/0208053 A1* 8/2012 Bender ............... H01M 2/1077
429/88

(Continued)

FOREIGN PATENT DOCUMENTS

CN 101151585 A 3/2008
CN 102763448 A 10/2012
(Continued)

OTHER PUBLICATIONS

International Search Report for Application No. PCT/EP2015/077440 dated Jan. 29, 2016 (English Translation, 2 pages).

*Primary Examiner* — Maria Laios
(74) *Attorney, Agent, or Firm* — Michael Best & Friedrich LLP

(57) ABSTRACT

The invention relates to a cooling plate (10) for battery cells (40), wherein the cooling plate (10) is in the form of a mounting plate and has mounting elements (12) for directly mounting the cooling plate (10) into a motor vehicle. It is further necessary for the cooling plate (10) together with a housing (20), in particular a half-shell housing, to form a closed-off space (30) for accommodating battery cells (40). The invention further relates to battery cells (40), to a battery cell module and also to a motor vehicle having a battery cell module of this kind.

21 Claims, 2 Drawing Sheets

(51) Int. Cl.

| | |
|---|---|
| *H01M 10/6554* | (2014.01) |
| *H01M 10/613* | (2014.01) |
| *H01M 10/6555* | (2014.01) |
| *H01M 10/6557* | (2014.01) |
| *B60L 50/64* | (2019.01) |
| *B60L 58/26* | (2019.01) |
| *H01M 10/6556* | (2014.01) |
| *B60K 1/04* | (2019.01) |
| *B60K 1/00* | (2006.01) |

(52) U.S. Cl.
CPC ....... *H01M 2/1077* (2013.01); *H01M 10/613* (2015.04); *H01M 10/625* (2015.04); *H01M 10/6554* (2015.04); *H01M 10/6555* (2015.04); *H01M 10/6556* (2015.04); *H01M 10/6557* (2015.04); *B60K 2001/005* (2013.01); *Y02T 10/705* (2013.01); *Y02T 10/7005* (2013.01)

(58) Field of Classification Search
CPC ...... H01M 10/6554–6557; B60L 50/64; B60L 58/26
See application file for complete search history.

(56) References Cited

U.S. PATENT DOCUMENTS

2013/0183555 A1  7/2013  Boddakayala
2014/0162105 A1  6/2014  Klausmann et al.

FOREIGN PATENT DOCUMENTS

| CN | 102856516 A | 1/2013 |
|---|---|---|
| DE | 102009006990 | 8/2010 |
| DE | 102010014183 A1 | 10/2011 |
| DE | 102011114772 | 4/2013 |
| DE | 102012224041 | 6/2013 |
| DE | 102013200239 | 7/2013 |
| DE | 102013207535 | 10/2014 |

* cited by examiner

COOLING PLATE FOR A BATTERY CELL IN THE FORM OF A MOUNTING PLATE

BACKGROUND OF THE INVENTION

The present invention relates to a cooling plate for battery cells, wherein the cooling plate is in the form of a mounting plate. The invention also relates to battery cells, a battery cell module and a motor vehicle comprising a battery cell module of this kind.

There is a considerable requirement worldwide for batteries for wide ranges of applications, for instance, on the one hand, for stationary installations such as, for example, wind power plants or solar power plants, but also, on the other hand, for mobile electronic appliances such as, for example, laptops and communication devices. Not least, it can also be anticipated that the requirement for batteries for vehicles, such as, for example, for hybrid and electric vehicles, will increase in the coming years. These batteries all have to meet very stringent requirements in respect of reliability, service life and performance.

Typically, a plurality of battery cells are electrically connected to each other in a series connection and/or parallel connection for this purpose in order to form powerful battery cell modules.

If battery cells or battery cell modules are intended to be used in a motor vehicle, measures have to be taken which allow the battery cells or battery cell modules to be incorporated into a motor vehicle in as simple and cost-effective a manner as possible. At the same time, the high safety standard has to be ensured. In the case of battery cell modules currently in use, numerous components and also complicated manufacturing processes are required for securing, mounting or otherwise fastening battery cells in order to ensure correct mounting, wherein laser welding, spot welding and also a large number of fastening elements or the like are used. In the case of welding, extremely high temperatures occur in processes of this kind and welding beads and related, undesired side effects are produced. Furthermore, the use of compression limiters (together with their associated connecting rods) along the stacking dimension during assembly of numerous battery cells to form a relatively large battery module can lead to tolerance problems during stacking.

DE 10 2013 200 239 A1 describes a cooling plate for battery cells for use in a motor vehicle, wherein the cooling plate is arranged such that it is seated directly on a vehicle surface which can be, for example, a floorpan.

SUMMARY OF THE INVENTION

The cooling plate according to the invention for battery cells is, in principle, in the form of a mounting plate. Therefore, the cooling plate has mounting elements for directly mounting the cooling plate in a motor vehicle. The mounting elements therefore allow battery cells to be incorporated into a motor vehicle by means of the cooling plate according to the invention. A further requirement for the cooling plate according to the invention is that the cooling plate, together with a housing, forms a closed-off space for accommodating battery cells.

The present invention is based on the realization that mounting of a battery into a motor vehicle can be further simplified by the cooling plate for the battery not only being designed as a mounting plate, and therefore installation of the battery into the motor vehicle by means of the cooling plate being very convenient, but rather also by the cooling plate, together with a housing, simultaneously forming a closed-off space for accommodating the battery.

Owing to the arrangement according to the invention, the cooling plate is very advantageously used in various functions. The cooling plate, together with a housing, provides a closed-off space for accommodating the battery, that is to say the cooling plate is also to be considered a component of an overall housing. As a result, the need to use a separate housing part for forming a closed-off space is advantageously eliminated.

It should further be noted that, owing to the invention, cooling of the battery by direct contact between the battery and the cooling plate is advantageously possible, without a housing with a closed-off space for the battery having to be dispensed with in the process. A closed-off space firstly protects the battery arranged therein against harmful effects from the outside. Moreover, a closed-off space of this kind not only protects the battery arranged therein but also further components such as the required electronics. The cell supervision circuit (CSC) may be mentioned by way of example here. Depending on the specific design, the invention allows both the battery and also other components which require cooling (for example BDU, battery disconnect unit) to be cooled by means of the cooling plate.

The harmful effects from the outside can be of a mechanical nature, such as, for instance, those which are caused in the event of an accident by a sudden action of force. On the other hand, a closed-off space also protects against the ingress of moisture, dust and harmful substances such as certain gases which could damage the battery. In an opposite situation, that is to say when substances escape in an uncontrolled manner from the battery itself in the event of a fault, the closed-off space also prevents said substances from spreading to the surrounding area.

Finally, it is established that the ability to dispense with certain separate components, which are required per se, without a loss in function can advantageously also reduce the costs of the arrangement. In addition, the arrangement is also more advantageous from a weight point of view since the omission of separate components always advantageously leads to savings in the total weight. This is true specifically with respect to weights in a motor vehicle.

BRIEF DESCRIPTION OF THE DRAWINGS

Exemplary embodiments of the invention will be explained in more detail in the following description and with reference to the drawings, in which.

DETAILED DESCRIPTION

Figure 1:
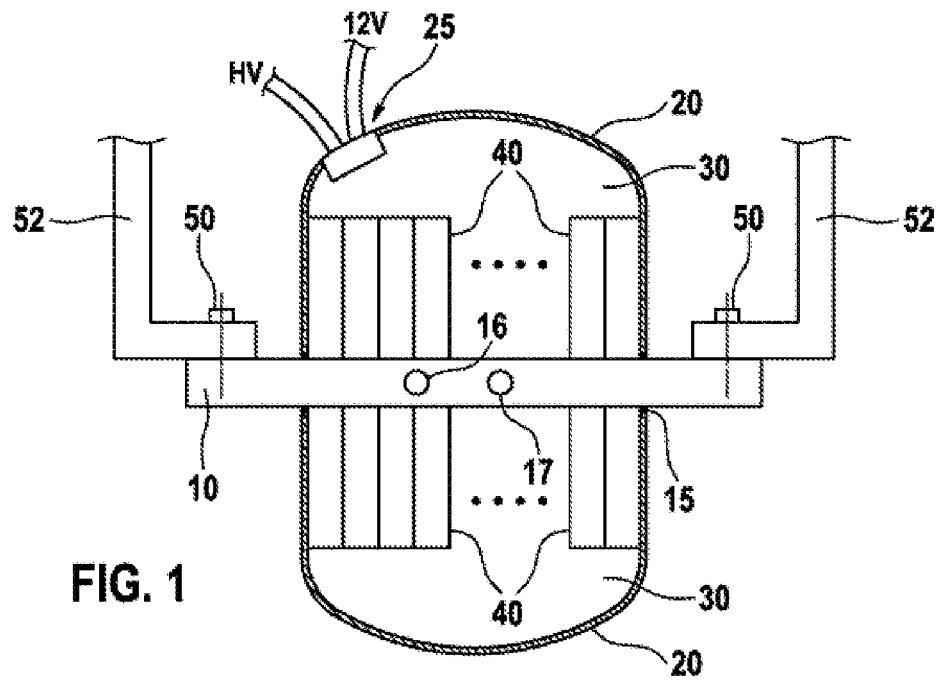
FIG. 1 shows a cross section through a first embodiment of the invention.

A first exemplary embodiment of the cooling plate according to the invention will now be explained with the aid of FIG. 1. In principle, the cooling plate 10 according to the invention for battery cells 40 is in the form of a mounting plate. The cooling plate 10 therefore has mounting elements 12 for directly mounting the cooling plate 10 into a motor vehicle. As required according to the invention, the cooling plate 10, together with a housing 20, forms a closed-off space 30 for accommodating battery cells 40.

The housing 20 provides, in principle, a space 30 for accommodating battery cells 40, wherein the housing 20 itself has an open side. If this open side is covered by a further boundary, as is realized by the cooling plate 10 here according to the invention, the result is a closed-off space 30.

Advantageous technical effects of this arrangement have already been described in detail above and will not be repeated here.

In this embodiment, the housing 20 is in the form of a half-shall housing. A half-shell housing provides the advantage that it can be of integral design and therefore does not have to be assembled from several components. A deep-drawn half-shell housing is preferred since production is cost-effective and reliable.

Figure 2:
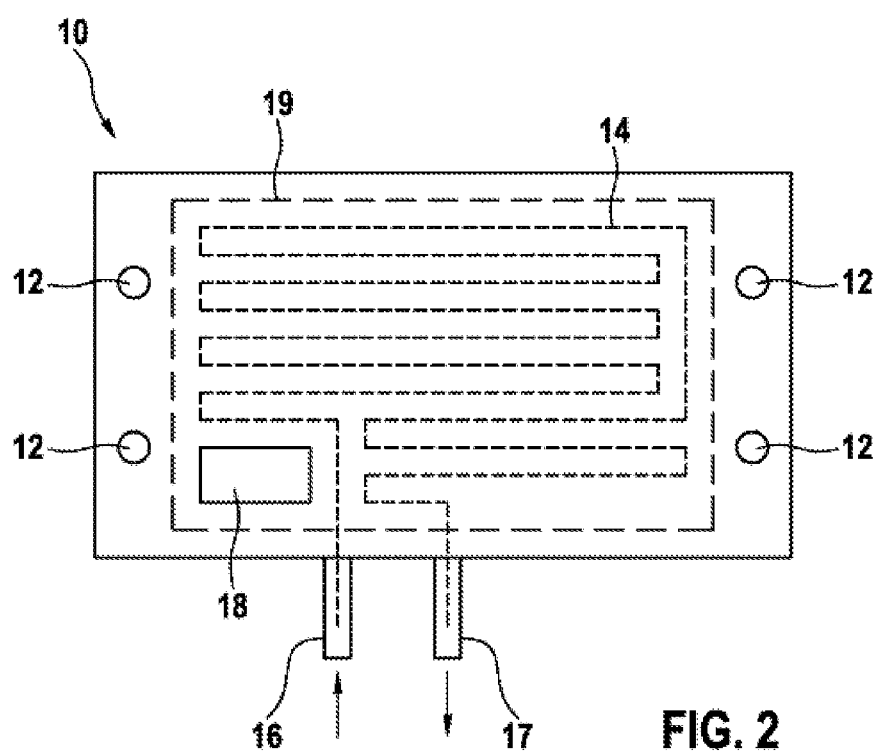
FIG. 2 shows a plan view of a first cooling plate according to the invention.

FIG. 2 shows a plan view of the cooling plate 10 according to the invention, wherein the housing 20 is not shown for reasons of clarity. Here, the mounting elements 12 are in the form of openings 12. The openings 12 can be used for mechanical connection to a motor vehicle by connecting means 50, such as bolts, being inserted into the openings 12 and in the process being connected to a fastening apparatus 52 of the motor vehicle. In particular, the openings 12 can be in the form of screw openings.

As an alternative or in addition to the openings 12, the mounting elements 12 of the cooling plate 10 can be in the form of fastening or holding elements, in particular locking or hook elements.

It is further proposed that the cooling plate 10 comprises cooling lines 14, in particular cooling channels or cooling hoses. In this case, the cooling lines 14 are preferably arranged in the interior of the cooling plate 10. Therefore, possible leaks in the cooling lines 14 do not cause any damage to the battery cells 40.

Furthermore, the cooling lines 14 comprise an inlet opening 16 and an outlet opening 17. Therefore, the cooling lines 14 can be connected to a cooling system. The inlet opening 16 and the outlet opening 17 are preferably designed as radiator connection pieces. Tubular attachment pieces of this kind as the inlet opening 16 and the outlet opening 17 provide stable and reliable connecting points to the cooling system.

As is clear from FIG. 1, the cooling plate 10 in this embodiment forms not only one, but rather two, closed-off spaces 30, each with a housing 20, which housings differ from one another. A first closed-off space 30 is formed above the cooling plate 10, while a second closed-off space 30 is formed below the cooling plate 10. Therefore, two closed-off spaces 30, which are separated from one another, for accommodating battery cells 40 are advantageously provided by only one cooling plate 10 together with two housings 20.

In respect of the upper closed-off space 30, the cooling plate 10 forms a lower boundary of the closed-off space 30. In respect of the lower closed-off space 30, the cooling plate 10 forms an upper boundary of the closed-off space 30. Therefore, the cooling plate 10 can advantageously form a lower boundary and an upper boundary of two closed-off spaces 30 simultaneously.

The two spaces 30 can be connected by means of a passage point 18 in the cooling plate 10. The passage point 18 is available to cables or other components which are intended to, in particular electrically, connect the two spaces 30 to one another. Depending on requirements, the passage point 18 can be formed by an opening which may be well sealed off.

Furthermore, the upper housing 20 has interfaces 25. Electrical lines, for instance 12 V lines or high-voltage lines, can be connected from the outside by means of these interfaces 25. These interfaces 25 can be realized as plug-type connections or else can be designed as apertures. It is important that the leaktightness is ensured.

Furthermore, FIG. 1 shows that the closed-off space 30 is sealed off by means of a seal 15 which is arranged between the housing 20 and the cooling plate 10. To this end, the cooling plate 10 preferably comprises a seal joint 19, as indicated in FIG. 2. The seal 15 can be designed in the form of a sealing lip. The leaktightness of the space 30 is further increased in this way.

The present invention also provides battery cells 40 which are arranged in a closed-off space 30 which is formed by a housing 20 and a cooling plate 10 according to the invention. The invention advantageously permits various arrangement options. For example, the battery cells 40 can be arranged directly on the cooling plate 10. The cooling plate 10 advantageously provides the option that the battery cells 40 are fixed in a stable manner on the cooling plate 10 by means of screw connections.

Depending on requirements, the invention also provides the option of the battery cells 40 being arranged in a manner suspended directly from the cooling plate 10. To this end, for example, the cover of the battery cells 40 could have a special plastic structure by way of which suspension is possible.

Incidentally, any required bracing of the battery cells in the lateral direction may possibly be achieved entirely by the housing 20.

Figure 3:
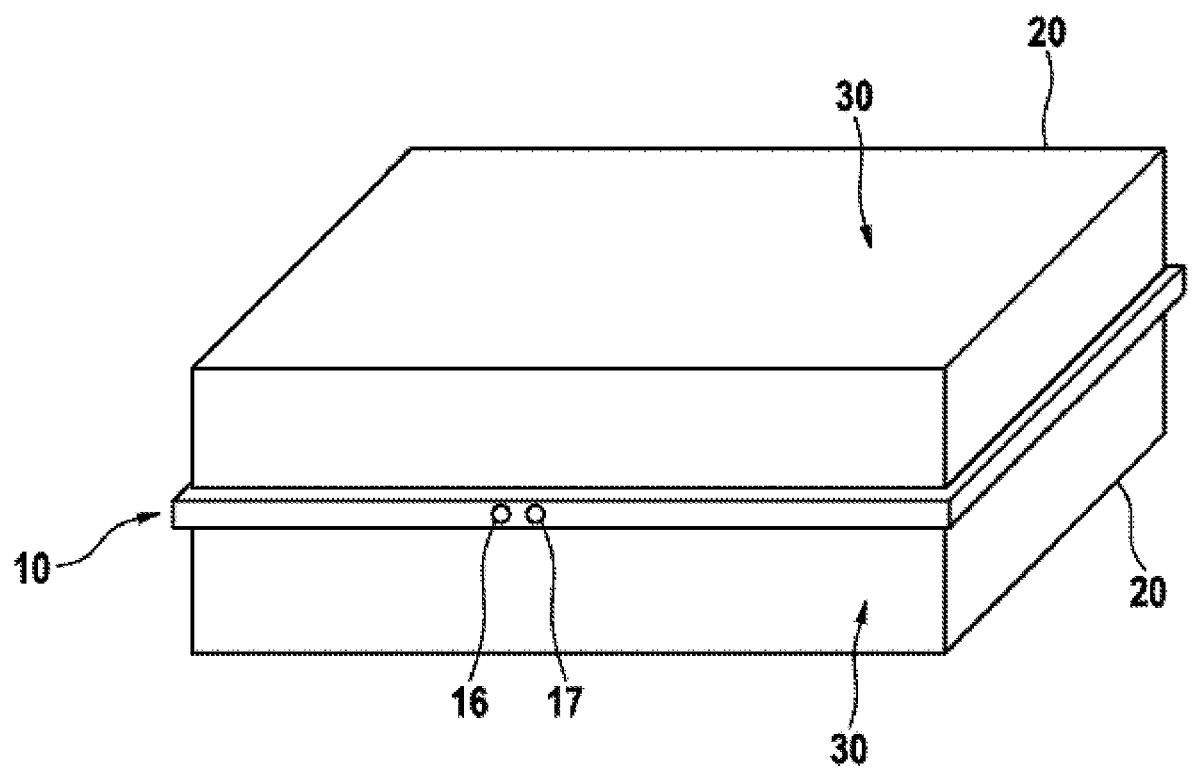
FIG. 3 shows a perspective view of a second embodiment of the invention.

A further embodiment of the invention is shown in FIG. 3. In this embodiment too, a cooling plate 10, together with two housings 20, forms a closed-off space 30 in each case. The mounting elements 12 are not shown in FIG. 3 since only a detail of the entire cooling plate 10 is shown in said figure. The housing 20 is flatter in comparison to the first embodiment according to FIG. 1. This design may be preferred when the volume available for installation in the motor vehicle does not allow a different shape or size. If required, the battery cells 40—not shown in FIG. 3—can be arranged not to stand on their bottom side, but rather to lie on one of their broad side surfaces (casing surface).

Incidentally, the battery cells 40 can be in the form of lithium-ion battery cells in all of the embodiments.

A battery cell module comprising battery cells 40 according to the invention is further provided, wherein the battery cells 40 are electrically connected to one another.

A battery cell module according to the invention of this kind can in turn be used or incorporated for various purposes. By way of example, it is proposed to provide a motor vehicle, in particular a motor vehicle which can be driven by an electric motor, with a battery cell module according to the invention, wherein the battery cell module is connected to a drive system of the motor vehicle and is mounted in the motor vehicle by means of a cooling plate 10 according to the invention.

The invention claimed is:

1. A battery cell module comprising:
   a cooling plate (10) for battery cells (40), wherein the cooling plate (10) is in the form of a mounting plate and has mounting elements (12) configured for directly mounting the cooling plate (10) into a motor vehicle,
   characterized in that the cooling plate (10), together with a first housing (20), forms a first closed-off space (30) for accommodating battery cells (40),
   wherein the cooling plate (10), together with a second housing (20), forms a second closed-off space (30) for accommodating battery cells (40), wherein the second closed-off space (30) is separated from the first closed-off space;

wherein the first housing (20) includes an outer periphery;

wherein the cooling plate (10) includes an outer periphery; and wherein the entire outer periphery of the cooling plate (10) is outside of the outer periphery of the first housing (20).

2. The battery cell module as claimed in claim 1, characterized in that the mounting elements (12) are in the form of openings.

3. The battery cell module as claimed in claim 1, characterized in that the mounting elements (12) are in the form of fastening or holding elements.

4. The battery cell module as claimed in claim 1, characterized in that the cooling plate (10) forms a lower boundary of one of the closed-off spaces (30).

5. The battery cell module as claimed in claim 1, characterized in that the cooling plate (10) forms an upper boundary of one of the closed-off spaces (30).

6. The battery cell module as claimed in claim 1, characterized in that the first closed-off space (30) is sealed off by means of a seal (15) which is arranged between the first housing (20) and the cooling plate (10).

7. The battery cell module as claimed in claim 1, characterized in that the cooling plate (10) comprises cooling lines (14).

8. The battery cell module as claimed in claim 7, characterized in that the cooling lines (14) are arranged in the interior of the cooling plate (10).

9. The battery cell module as claimed in claim 7, characterized in that the cooling lines (14) comprise an inlet opening (16) and an outlet opening (17).

10. The battery cell module as claimed in claim 1, wherein the housing is a half-shell housing.

11. A battery cell module having a plurality of battery cells (40) electrically connected to one another, the battery cell module comprising a cooling plate (10) in the form of a mounting plate, the cooling plate having mounting elements (12) configured for directly mounting the cooling plate (10) into a motor vehicle, a first housing (20) which, together with the cooling plate, forms a first closed-off space (30), a second housing (20) which, together with the cooling plate, forms a second closed-off space (30), separate from the first closed-off space (30), and battery cells (40) arranged in the first and second closed-off spaces (30) formed by the first and second housings (20) and the cooling plate (10), wherein the first housing (20) includes an outer periphery;

wherein the cooling plate (10) includes an outer periphery; and wherein the entire outer periphery of the cooling plate (10) is outside of the outer periphery of the first housing (20).

12. The battery cell module as claimed in claim 11, characterized in that the battery cells (40) are arranged directly on the cooling plate (10).

13. The battery cell module as claimed in claim 11, characterized in that the battery cells (40) are arranged in a manner suspended directly from the cooling plate (10).

14. A motor vehicle, comprising a battery cell module as claimed in claim 11, wherein the battery cell module is connected to a drive system of the motor vehicle and is mounted in the motor vehicle by means of the cooling plate (10).

15. The battery cell module as claimed in claim 11, characterized in that the mounting elements (12) are in the form of openings.

16. The battery cell module as claimed in claim 11, characterized in that the mounting elements (12) are in the form of fastening or holding elements.

17. The battery cell module as claimed in claim 11, characterized in that the cooling plate (10) forms a lower boundary of the first closed-off space (30).

18. The battery cell module as claimed in claim 11, characterized in that the cooling plate (10) forms an upper boundary of the second closed-off space (30).

19. The battery cell module as claimed in claim 11, characterized in that the first closed-off space (30) is sealed off by means of a seal (15) which is arranged between the first housing (20) and the cooling plate (10).

20. The battery cell module as claimed in claim 11, characterized in that the cooling plate (10) comprises cooling lines (14).

21. The battery cell module as claimed in claim 20, characterized in that the cooling lines (14) are arranged in the interior of the cooling plate (10).

* * * * *